United States Patent
Sakata

(10) Patent No.: US 7,121,673 B2
(45) Date of Patent: Oct. 17, 2006

(54) METHOD FOR ATTACHING AN ELECTRIC POWER OUTER MIRROR-HOUSING DEVICE TO A VEHICLE, SUCH AN ELECTRIC POWER OUTER MIRROR-HOUSING DEVICE IN THE VEHICLE AND THE VEHICLE ATTACHED WITH SUCH ELECTRIC POWER OUTER MIRROR-HOUSING DEVICES

(75) Inventor: Ikuo Sakata, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 147 days.

(21) Appl. No.: 10/989,399

(22) Filed: Nov. 17, 2004

(65) Prior Publication Data

US 2005/0105197 A1    May 19, 2005

(30) Foreign Application Priority Data

Nov. 19, 2003  (JP) .............................. 2003-389540
Oct. 19, 2004  (JP) .............................. 2004-303915

(51) Int. Cl.
*G02B 7/182*    (2006.01)

(52) U.S. Cl. .................................................... 359/877

(58) Field of Classification Search ................ 359/871, 359/872, 877
See application file for complete search history.

(56) References Cited

U.S. PATENT DOCUMENTS 5,172,884 A    12/1992  Ishiyama
5,369,530 A    11/1994  Yamauchi et al.
5,781,354 A     7/1998  Sakata
5,793,171 A     8/1998  Hayashi et al.
6,871,969 B1 *  3/2005  Yamauchi et al. .......... 359/877

FOREIGN PATENT DOCUMENTS

JP    8-268160 A    10/1996
JP   10-297372 A    11/1998

* cited by examiner

*Primary Examiner*—Euncha P. Cherry
(74) *Attorney, Agent, or Firm*—Foley & Lardner LLP

(57) ABSTRACT

A method is disclosed for attaching an electric power outer mirror-housing device for a vehicle to the vehicle. The housing device includes a shaft carrying an outer mirror and a driving mechanism. The driving mechanism includes a motor, a worm gear, a helical gear inserted around the shaft slidable along an axial direction of the shaft, and a clutch holder engaged with the helical gear and adapted to transmit a turning force of the helical gear via the worm gear to the shaft. The method includes setting twisting directions of the helical and worm gears so that when the housing device is attached to a given portion of the vehicle, a turning force may be applied upon the shaft, in a direction opposed to a pressure of wind flowing from a front side to a rear side of the vehicle, by motion of the helical gear relative to the worm gear owing to vibration of the vehicle, and attaching the housing device to the above given portion of the vehicle.

5 Claims, 13 Drawing Sheets

Electric power vehicle outer mirror-housing device

METHOD FOR ATTACHING AN ELECTRIC POWER OUTER MIRROR-HOUSING DEVICE TO A VEHICLE, SUCH AN ELECTRIC POWER OUTER MIRROR-HOUSING DEVICE IN THE VEHICLE AND THE VEHICLE ATTACHED WITH SUCH ELECTRIC POWER OUTER MIRROR-HOUSING DEVICES

BACKGROUND OF THE INVENTION

The present invention relates to an improvement on an electric power outer mirror-housing device in a vehicle, which electrically drives a shaft carrying an outer mirror to turn the mirror between a use position and a housed position.

RELATED ART STATEMENT

An electric power outer mirror-housing device 2 as shown in FIGS. 1 and 2 has been heretofore known, which electrically drives a shaft 1 carrying an outer mirror to turn the mirror between a use position and a housed position. The housing device 2 includes a driving mechanism 3 for electrically driving and turning the shaft 1 and a casing 4 housing the driving mechanism 3 and fixed to a vehicle body.

The driving mechanism 3 is constituted substantially by a motor not shown, a helical gear 5 to be driven by this motor, a worm gear 6 to be turned with the helical gear 5, a helical gear 7 meshing with the worm gear 6 and being inserted around the shaft 1 slidably along an axial direction of the shaft, a clutch holder 8 engaged with the helical gear 7 and transmitting turning force to the shaft 1 and a spring 9 for urging the helical gear 7 toward the clutch holder 8. See JP-A 10-297372, for example.

As shown in FIGS. 3A and 3B, the electric power vehicle outer mirror-housing devices are attached and used at both sides of a front driving side 11 of the vehicle 10. There is a tendency that sizes of such housing devices become greater to improve visual recognition.

The driving mechanisms 3 are designed in the same construction so as to commonly use parts therefor.

When pressure of wind is applied to the outer mirror in the conventional electric power outer mirror-housing device 2 at a use position in some cases, there occurred a phenomenon that the outer mirror 12 tilted toward the rear side of the vehicle.

SUMMARY OF THE INVENTION

The present inventors discovered that vibration of the vehicle is a cause for the phenomenon that the outer mirror 12 is tilted toward the rear side of the vehicle.

That is, as shown in FIG. 4, the conventional electric power vehicle outer mirror-housing device 2 uses a right-hand thread helical gear 7 and the right-hand thread worm gear 6. Thus, when the shaft 1 is raised from the state of FIG. 1 to that of FIG. 2 by the vibration of the vehicle in the state that the electric power housing device 2 is in use, the teeth of the helical gear move along thread grooves 6a of the worm gear 6 as shown in FIG. 5.

As a result, turning force acts upon the shaft 1 via the helical gear 7 to turn the shaft in a counterclockwise direction. In case where the electric power vehicle outer mirror-housing device is so attached to the vehicle that it may receive torque in a counterclockwise with pressure of wind on forward driving, a direction of a torque applied to the outer mirror 12 with wind pressure overlaps with a rotary direction of the shaft 1 due to the vehicle vibration, so that the outer mirror is caused to be tilted toward the rear side of the vehicle with the wind pressure.

In order to prevent the phenomenon that the outer mirror may be caused to be tilted toward the rear side of the vehicle with the wind pressure, it may be considered that the load of the spring 9 or the clutching force for preventing collision impact is raised. However, when the structure is modified to raise the load of the spring 9 or the clutching force at a time of preventing collision impact, safety at the time of collision may be affected.

In view of the above circumstances, the present invention is aimed at providing a method of fitting an electric power outer mirror-housing device to a vehicle, wherein the phenomenon that the housing device is tilted toward the rear side of the vehicle with wind pressure may be prevented without modifying the load of the spring or the clutching force at the time of preventing the collision impact. The invention is also aimed at providing such an electric power outer mirror-housing device to be used for this method as well as a vehicle attached with such electric power outer mirror-housing devices.

The method for attaching an electric power outer mirror-housing device for a vehicle to the vehicle according to the present invention, said outer mirror-housing device comprising a shaft carrying an outer mirror and a driving mechanism for electrically driving the shaft and thereby turning the mirror between a use position and a housed position, said driving mechanism comprising a motor, a worm gear, a helical gear meshing with the worm gear and being inserted around the shaft and slidable along an axial direction of the shaft, said worm gear being adapted for transmitting turning motions of said motor to said helical, and a clutch holder engaged with the helical gear and adapted to transmit a turning force of the helical gear to the shaft, said method comprising setting twisting directions of the helical gear and the worm gear so that when the housing device is attached to a given portion of the vehicle, a turning force may be applied upon the shaft, in a direction opposed to a pressure of wind flowing from a front side to a rear side of the vehicle, by motion of the helical gear relative to the worm gear owing to vibration of the vehicle, and attaching the housing device to said given portion of the vehicle.

The present invention further relates to an electric power outer mirror-housing device to be attached to a given portion of a vehicle, comprising a shaft carrying an outer mirror and a driving mechanism for electrically driving the shaft and thereby turning the mirror between a use position and a housed position, said driving mechanism comprising a motor, a worm gear for transmitting turning motions of said motor, a helical gear meshing with the worm gear, and being inserted around the shaft and slidable along an axial direction of the shaft, and a clutch holder engaged with the helical gear and adapted to transmit a turning force of the helical gear to the shaft, wherein twisting directions of the helical gear and the worm gear are so set that when the housing device is attached to said given portion of the vehicle, a turning force may be applied upon the shaft, in a direction opposed to a pressure of wind flowing from a front side to a rear side of the vehicle, by motion of the helical gear relative to the worm gear owing to vibration of the vehicle, and attaching the housing device to said given portion of the vehicle.

The present invention further provides a method for attaching a pair of electric power outer mirror-housing devices for a vehicle to right and left sides of the vehicle, each of said outer mirror-housing device comprising a shaft carrying an outer mirror and a driving mechanism for electrically driving the shaft and thereby turning the mirror between a use position and a housed position, said driving mechanism comprising a motor, a worm gear for transmitting turning motions of said motor, a helical gear meshing with the worm gear and being inserted around the shaft and slidable along an axial direction of the shaft, and a clutch holder engaged with the helical gear and adapted to transmit a turning force of the helical gear to the shaft, said method comprising setting twisting directions of the helical gear and the worm gear so that when the housing device is attached to a given portion of the vehicle, a turning force may be applied upon the shaft, in a direction opposed to a pressure of wind flowing from a front side to a rear side of the vehicle, by motion of the helical gear relative to the worm gear owing to vibration of the vehicle, and attaching the housing device to said given portion of the vehicle, said method comprising setting twisting directions of the helical gear and the worm gear for each of the housing devices so that when each of the housing device is attached to the corresponding right or left side of the vehicle, a turning force may be applied upon the shaft, in a direction opposed to a pressure of wind flowing from a front side to a rear side of the vehicle, by motion of the helical gear relative to the worm gear owing to vibration of the vehicle, and attaching the housing devices to said right and left sides of the vehicle, respectively.

The present invention also relates to a pair of electric power outer mirror-housing devices for a vehicle to right and left sides of the vehicle, each of said outer mirror-housing device comprising a shaft carrying an outer mirror and a driving mechanism for electrically driving the shaft and thereby turning the mirror between a use position and a housed position, said driving mechanism comprising a motor, a worm gear for transmitting turning motions of said motor, a helical gear meshing with the worm gear, and being inserted around the shaft and slidable along an axial direction of the shaft, and a clutch holder engaged with the helical gear and adapted to transmit a turning force of the helical gear to the shaft, wherein twisting directions of the helical gear and the worm gear for each of the housing devices are so set that when each of the housing device is attached to the corresponding right or left side of the vehicle, a turning force may be applied upon the shaft, in a direction opposed to a pressure of wind flowing from a front side to a rear side of the vehicle, by motion of the helical gear relative to the worm gear owing to vibration of the vehicle, and attaching the housing devices to said right and left sides of the vehicle, respectively.

The present invention further relates to a vehicle comprising said pair of the electric power outer mirror-housing devices to right and left sides of the vehicle.

According to the present invention, the twisting direction of the helical gear and that of the worm gear are set such that rotary force against the pressure of wind flowing from the front side to the rear side of the vehicle acts upon the shaft through movement of the helical gear relative to the worm gear based on vibration of the vehicle. Thus, when the helical gear is to move along the thread grooves of the worm gear through the vibration of the vehicle, the rotary force acts upon the shaft in the direction against the pressure of the wind, so that the force of tilting the outer mirror with the wind pressure can be reduced.

BRIEF DESCRIPTION OF THE DRAWINGS

For a better understanding of the invention, reference is made to the attached drawings, wherein.

In the following, embodiments of the electric power outer mirror-housing device according to the present invention will be explained with reference to the attached drawings.

EMBODIMENTS

Figure 6:
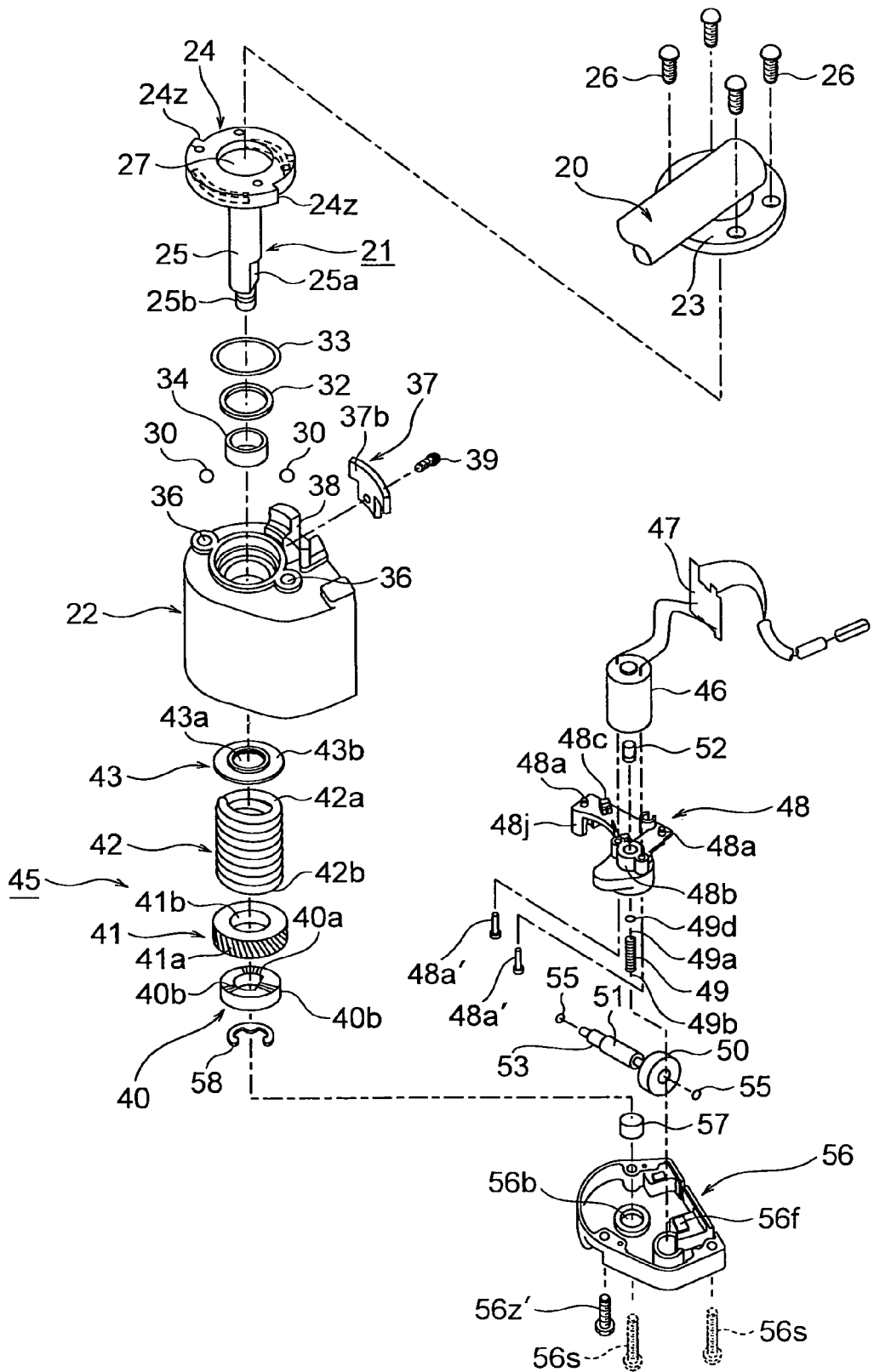
FIG. 6 is a decomposed perspective view showing a principal construction of the electric power vehicle outer mirror-housing device according to the present invention.

In FIG. 6, reference numerals 20, 21 and 22 denote a stay, a shaft, and an upper housing casing, respectively. An outer mirror 12 is attached to a tip portion of the stay.

Figure 7:
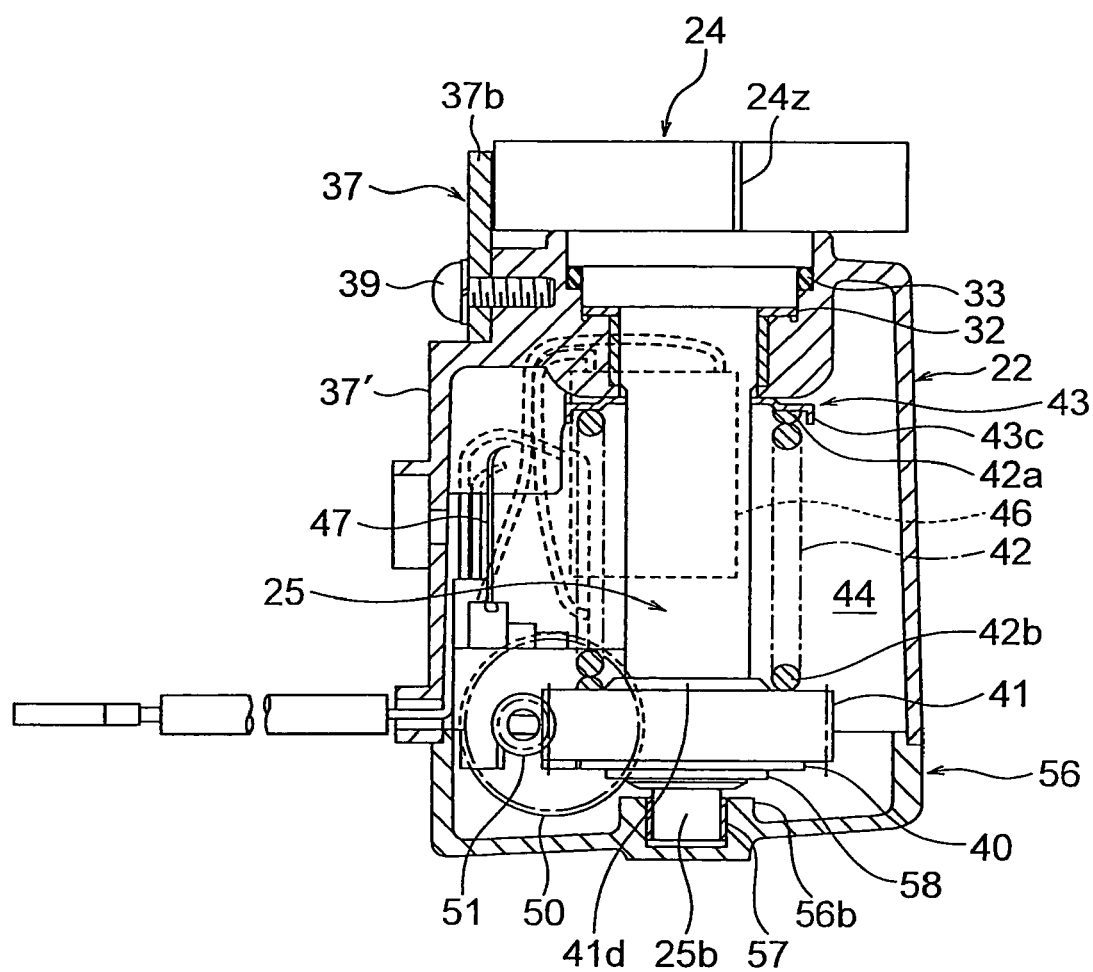
FIG. 7 is a sectional view showing an interior construction of the electric power vehicle outer mirror-housing device according to the present invention.

A base portion of the stay 20 is fixedly welded to a fitting flange 23. As shown in FIGS. 6 and 7, the shaft 21 has an engaging flange portion 24 and a columnar portion 25. The fitting flange 23 is tightly connected to the engaging flange portion 24 with bolts 26.

Figure 8:
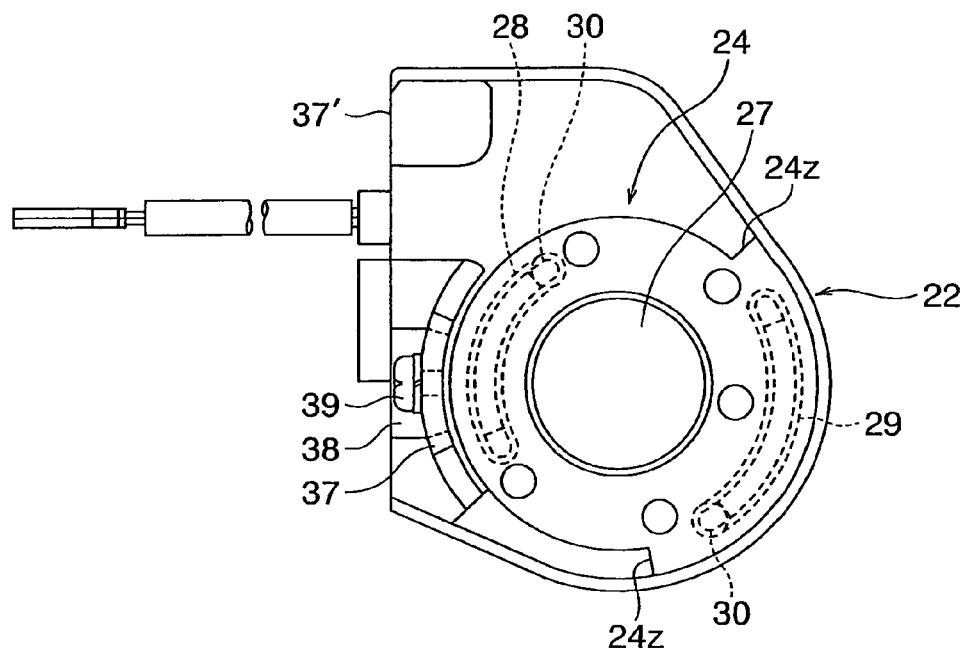
FIG. 8 is a plane view of the electric power vehicle outer mirror-housing device according to the present invention as viewed from an upper side before a stay is attached.
Figure 9:
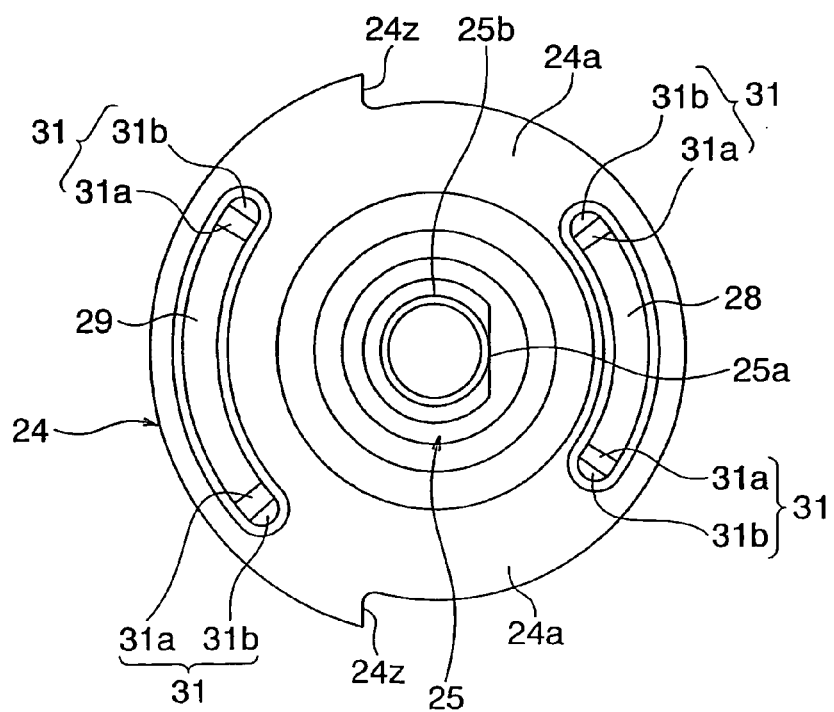
FIG. 9 is a bottom view of the shaft in the housing device according to the present invention.

The engaging flange portion 24 has a circular depression 27 in its central portion as shown in FIG. 8 and arch ball guide grooves 28 and 29 at a peripheral portion as shown in FIG. 9. These ball guide grooves 28 and 29 restrain a rotation angle of the shaft 21 between a vehicle outer mirror-use position (sidewise shifted position) and a vehicle outer mirror-housed position (forward retracted position).

Figure 10:
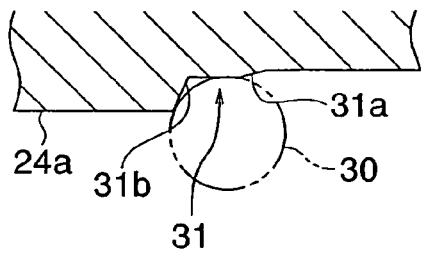
FIG. 10 is an enlarged view showing sliding relationship between a ball and a guide groove of a flange portion in the housing device according to the present invention.

As shown in an enlarged scale in FIG. 10, stepped portions 31 are formed at terminal ends of the rotation area of each of the ball guide grooves 28 and 29 to raise the shaft 2 in cooperation with the ball 30. The stepped portion 31 includes an inclined face 31a and a stopper face 31b. The stopper faces 31b set the rotation angle of the shaft 21 from the housed position to the use position.

When a force greater than a preset level is applied to the shaft 21, the ball 30 relatively moves to a bottom face 24a of the engaging flange portion 24 over the stepped portion of the stopper face 31b. The columnar portion 25 of shaft 21 has a sectional shape having a D-letter shape with a flat face 25a.

The columnar portion 25 has a smaller diameter portion 25b at a lower end. A washer 32, an O-ring 33 and a bushing 34 are inserted around the columnar portion 25 of the shaft 21. The upper casing 22 has an annular wall 35 which has semi-spherical ball-inserting holes 36, 36 at opposed positions, respectively.

Figure 11:
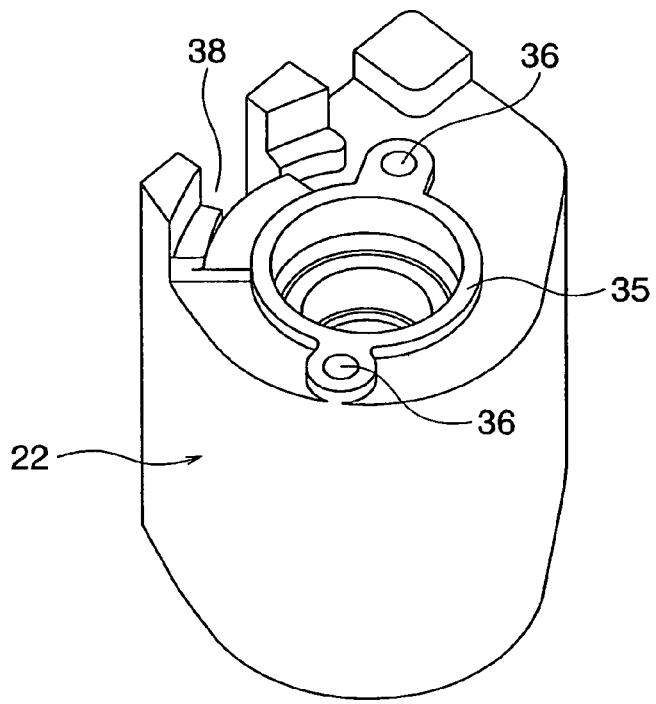
FIG. 11 is a perspective view of an upper casing in the housing device according to the present invention.

As shown in FIGS. 6, 8 and 11, an upper portion of the upper casing 22 is provided with a depression 38 for fitting a T letter-shaped stopper member 37 at a flat face portion 37'. The stopper member 37 is fixed to the upper casing 22 with a screw member 39 as shown in FIG. 6.

Figure 12:
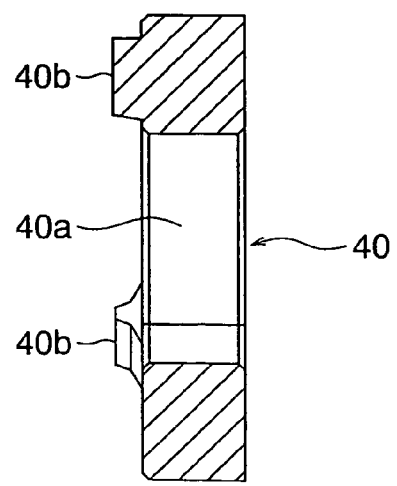
FIG. 12 is a sectional view of a clutch holder shown in FIG. 6.

As shown in FIG. 6, a clutch holder 40 is fitted around the columnar portion 25. The clutch holder 40 has a D-cut shaped insertion hole 40a in its central portion. As shown in FIG. 12, the rotational force of the clutch holder 40 is transmitted to the shaft 21 in the state that the shaft 21 having the flat face 25a is fitted into the D-cut shaped insertion hole 40a. As shown in FIG. 12, engaging projections 40b are formed at a peripheral portion of the clutch holder 40 around the D-cut shaped insertion hole 40a. The engaging projections 40b are formed each in a mountainous shape every 120 degrees in this embodiment. The clutch holder 40 meshes with a helical gear 41.

Figure 13:
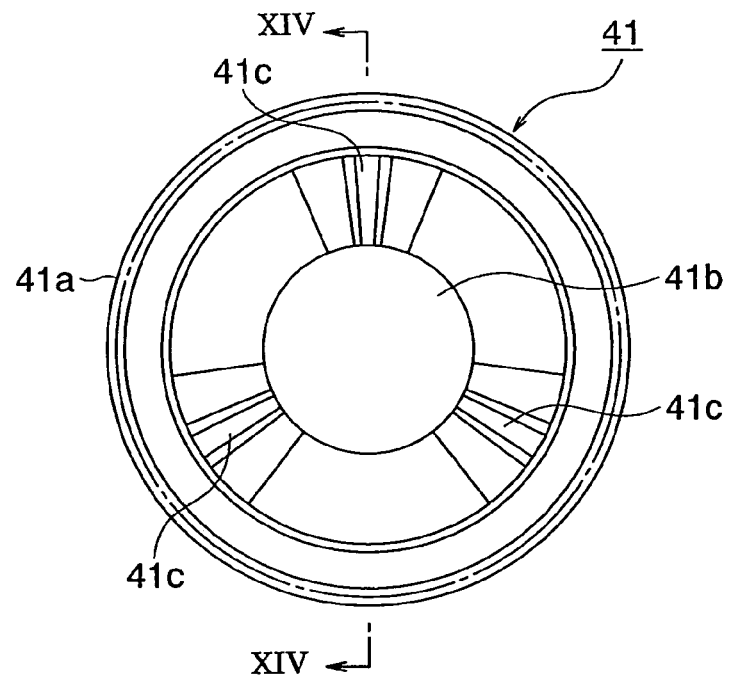
FIG. 13 is a plane view of the helical gear shown in FIG. 6.
Figure 14:
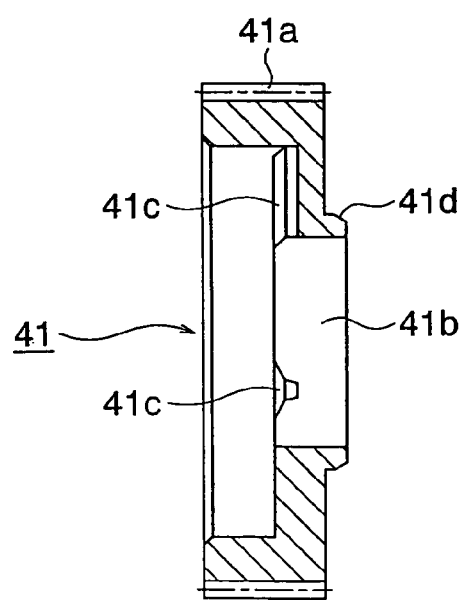
FIG. 14 is a sectional view of FIG. 13 along a line XIV—XIV.

As shown in FIGS. 13 and 14, the helical gear 41 has a teeth portion 41a, a circular central hole 41b, engaging depressions 41c and a spring-locating annular rib 41d. The engaging depressions 41c are formed correspondingly to the engaging projections 40b, respectively. As shown in FIG. 6, the helical gear 41 is downwardly urged with the spring 42 to always mesh the helical gear 41 with the clutch holder 40.

An upper end 42a of the spring 42 is butted against a washer 43, and its lower end 42b is butted against an upper face of the helical gear 41. The washer 43 includes a D-shaped hole 43a and a receiving face 43b as shown in FIG. 6 and an annular peripheral wall 43c as shown in FIG. 7. The washer 43 is turned integrally with the spring 42 and shaft 21 when the shaft is turned.

As shown in FIG. 7, the upper casing 22 is interiorly formed with a space 44 for housing a driving mechanism 45. As shown in FIG. 6, the driving mechanism 45 is substantially constructed with a motor 46, a print circuit board 47, a plate member 48, a worm gear 49, a helical gear 50, and a worm gear 51.

The worm gear 49 meshes with the helical gear 50, the helical gear 50 is rotated integrally with the worm gear 51, the worm gear 51 meshes with the helical gear 41, and the shaft 21 is turned by the rotation of the motor 46 via the worm gear 49, the helical gear 50, the worm gear 51, the helical gear 41 and the clutch holder 40.

Figure 15:
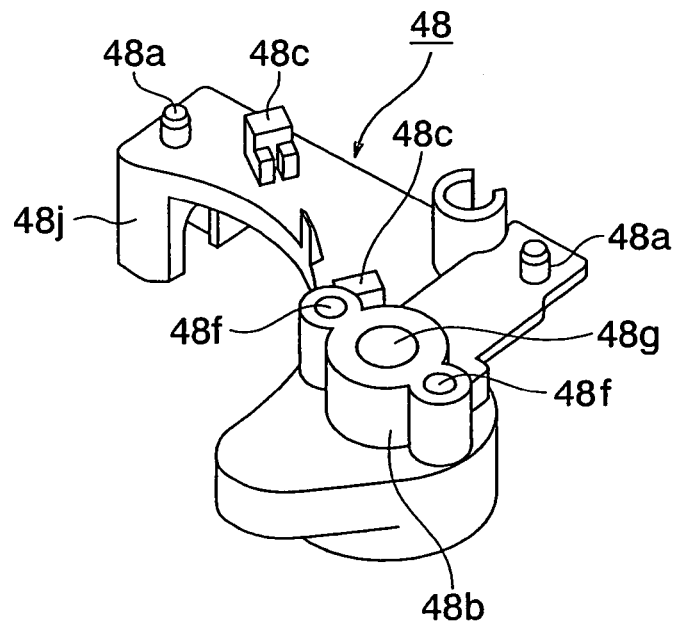
FIG. 15 is a perspective view of a plate member in FIG. 6 as viewed from the upper side.

As shown in FIGS. 6 and 15, the plate member 48 is provided at its upper face with fitting pins 48a, 48a, a motor-attaching portion 48b and projections 48c, 48c for insertion of the print circuit board 47. The plate member 48 is fixed to the upper casing 22 by inserting the fitting pins 48a, 48a into pin holes (not shown) of the upper casing 22.

The motor-fitting portion 48b is provided with an insertion hole 48a for a joint member 52 to directly connect an output shaft of the motor 46 with the worm gear 49, fitting screw holes 48f and an insertion hole 48h (See FIG. 16) for the insertion of the shaft 49a of the worm gear 49. A washer 49d is fitted around the shaft portion 49a of the worm gear 49. The motor 46 is fixed to the motor-fitting portion 48b with screws 48a', 48'.

Figure 16:
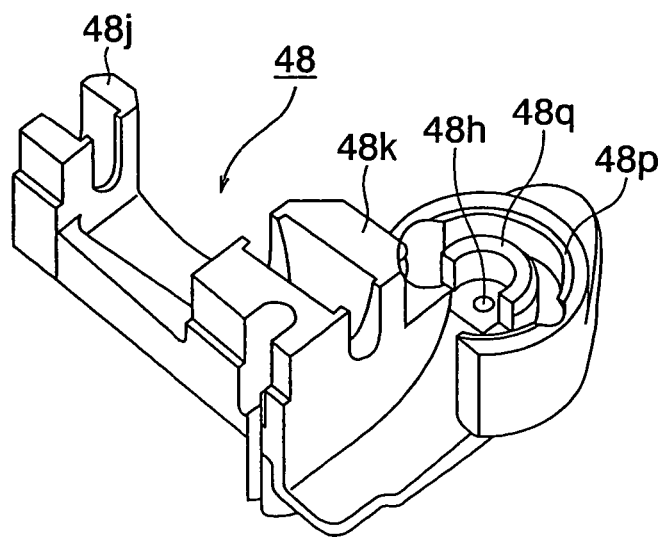
FIG. 16 is a perspective view of the plate member in FIG. 6 as viewed from the lower side.
Figure 17:
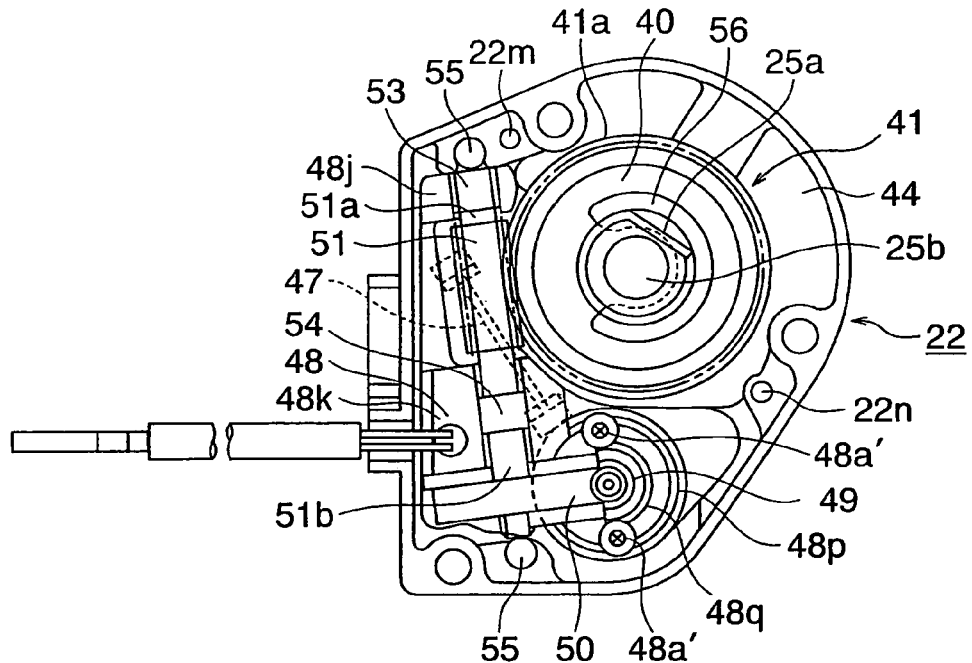
FIG. 17 is a bottom plane view showing a state that a driving mechanism is assembled into an upper casing in the housing device according to the present invention.

As shown in FIG. 16, the plate member 48 is provided at a lower face with paired engaging portions 48j and 48k for fixing cylindrical bushings 53 and 54 (See FIG. 17). The engaging portions 48j and 48k function as a pair of bearings for supporting shaft portions 51a and 51b of the worm gear 51 via the bushings 53 and 54.

End faces of the shaft portions 51a and 51b of the worm gear 51 are butted against balls 55, 55, respectively. The plate member 48 is formed with a locating outer cylinder 48p and a locating inner cylinder 48q at a side opposite to the motor-attaching portion 48b. A locating cylinder 56a of the lower casing 56 is fitted between the locating outer cylinder 48p and the locating inner cylinder 48q. The locating cylinder 56a is concentrically provided with a shaft hole 56g for supporting the shaft portion 49b of the worm gear 49.

Figure 18:
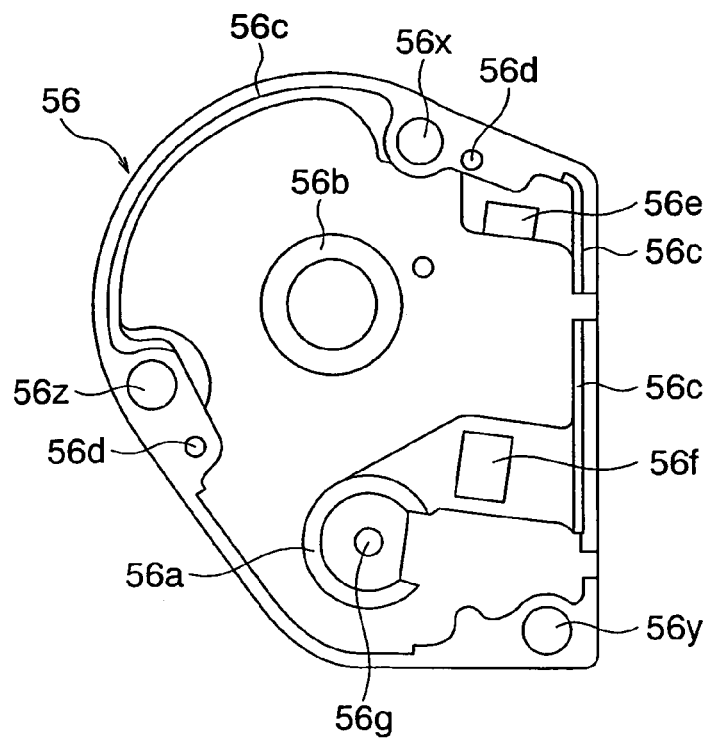
FIG. 18 is a plane view of a lower casing of the in the specific embodiment according to the present invention.

As shown in FIG. 18, the lower casing 56 is provided with a bearing hole 56b for the shaft 21, an engaging wall 56c for the upper casing 22, pins 56d, 56d to be fitted into the pin holes 22m, 22n of the upper casing 22, bushing holding portions 56e and 56f for holding the bushings 53, 54, and screw holes 56x, 56y and 56z.

The lower casing 56 is fixed to the upper casing 3 with the screws 56z', 56s and 56s. The bushing 57 is fitted into the bearing cylinder 56b, and the small-diameter cylindrical portion 25b of the shaft 21 is fitted into the bushing 57. An E-ring 58 is fitted around the columnar portion 25 immediately above the small-diameter portion 25b of the shaft 21.

The E-ring 58 functions to support the helical gear 41 and the clutch holder 40 against urging force of the spring 42.

As shown in FIGS. 6, 8 and 9, the engaging flange 24 is formed at its outer periphery with an engaging cut portion 24z. An engaging planar portion 37 of the stopper member 37 faces a rotary range of the engaging cut portion 24z.

The shaft 21 is turned by the motor 46. The rotation angle of the shaft 21 between the use position and the housed position is generally determined by the turning areas of the ball guide grooves 28, 29. When a lock current (excess current) flowing the motor 46 is detected with an excess current detecting circuit of the print circuit board 47, the motor 46 is turned off at the use position or the housed position, for example.

When the ball 30 is located at the stepped portion 31, the shaft 21 is slightly raised. Consequently, the spring 42 is slightly compressed, the press contact force of the ball 30 upon the flange portion 24 is increased and the shaft 212 is held at the use position or the housed position without generally being jounced.

The detailed description is shown in JP-A 8-268160, and its detailed explanation will be omitted.

Figure 1:
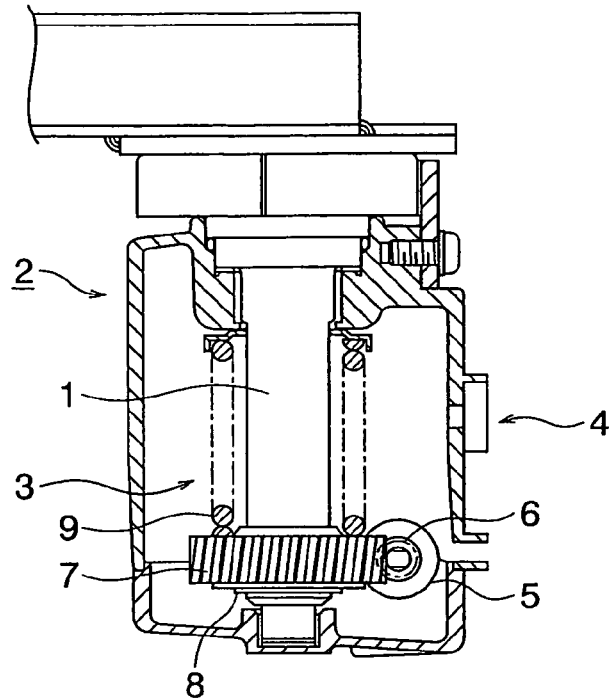
FIG. 1 is a figure for schematically illustrating inconvenience of the conventional electric power outer mirror-housing device for the vehicle in the state that the helical gear is present at a standard position relative to the worm gear.
Figure 2:
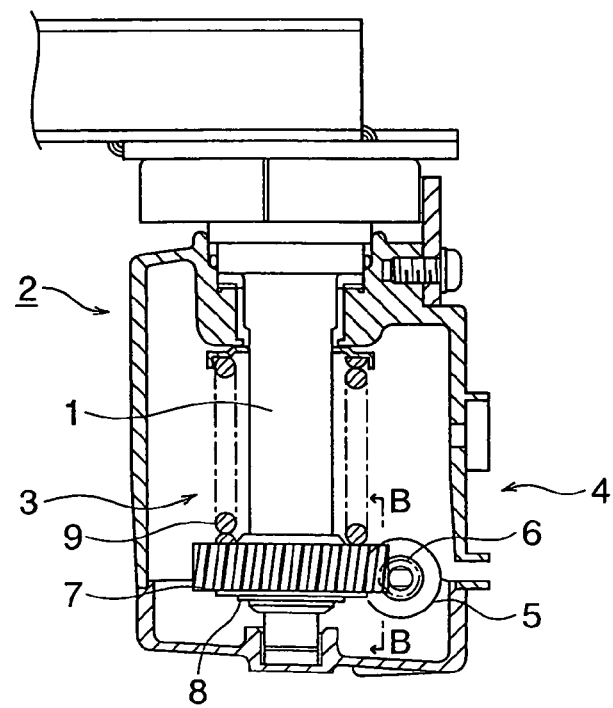
FIG. 2 is a figure for schematically illustrating inconvenience of the conventional electric power outer mirror-housing device for the vehicle in the state that the helical gear is raised relative to the worm gear by vibration of the vehicle.
Figure 3A:
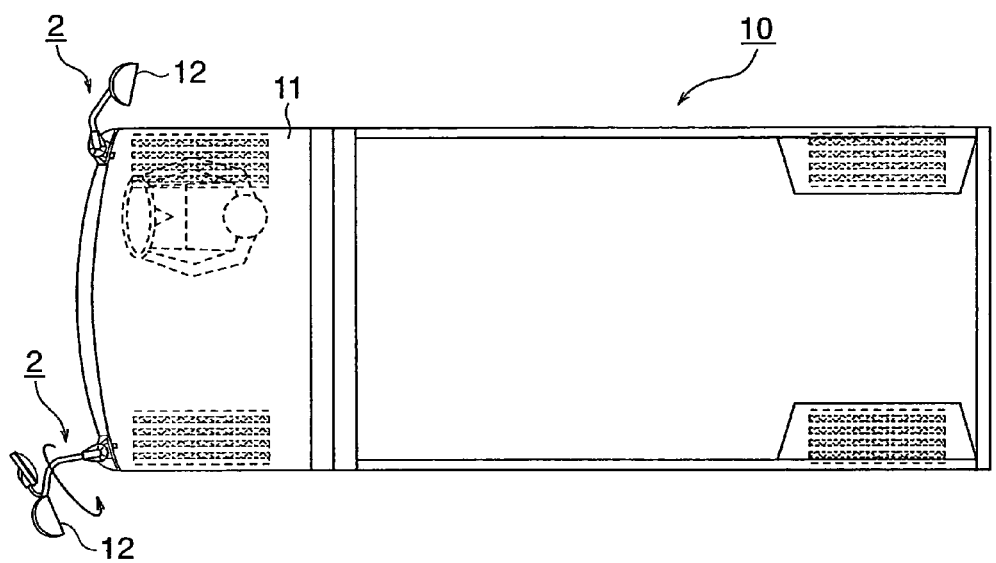
FIGS. 3A and 3B are figures illustrating the state that the conventional electric power vehicle outer mirror-housing devices are attached to a driving side, FIG. 3A being a plane view showing that the housing devices are attached to right and left sides of the front driving side, respectively, and FIG. 3B being a front view of FIG. 3A.
Figure 3B:
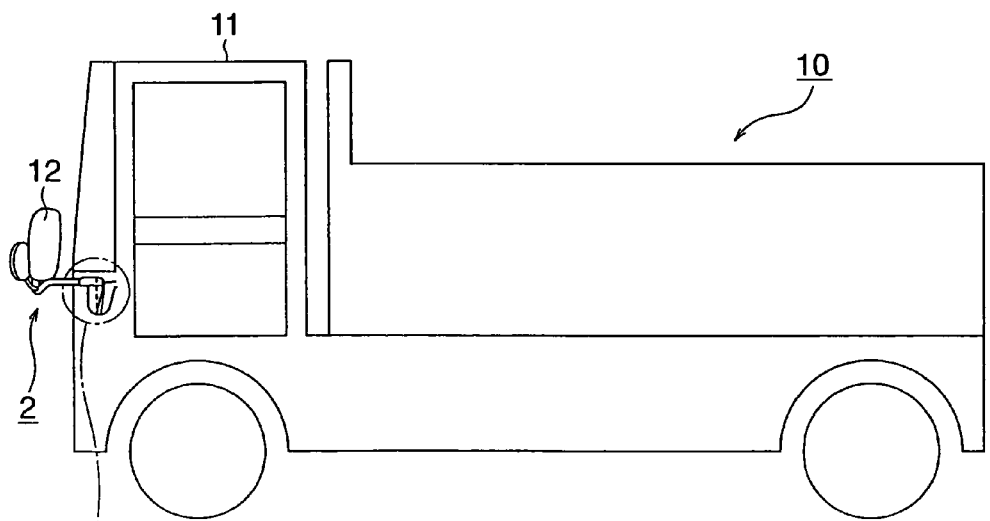
Figure 4:
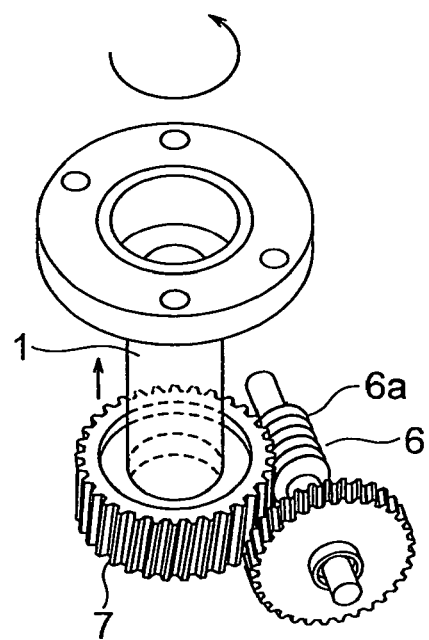
FIG. 4 is a schematic view for illustrating a rotary direction of the shaft when the helical gear moves relative to the worm gear through vibration of the vehicle.
Figure 5:
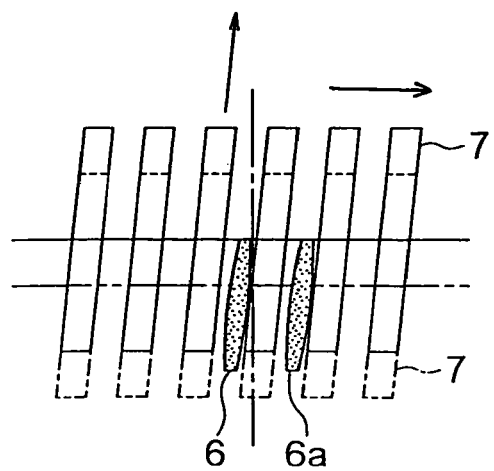
FIG. 5 is a figure for illustrating a state that the helical gear moves relative to the thread grooves of the worm gear through the vibration of the vehicle.

In the electric power vehicle outer mirror-housing device 2 attached to the right side of the front driving side 11 shown in FIGS. 3A and 3B, the right-twisted helical gear 41 (that is, as the helical gear 41 goes farther along the teeth lines (tooth grooves) when viewed in the axial direction, the helical threads turn clockwise in the advancing direction, and the right-twisted worm gear 51 meshing with this helical gear 41 is used.

In the electric power vehicle outer mirror-housing device 2 attached to the left side of the driving side 11, the left-twisted helical gear 41 (that is, as the helical gear 41 goes farther along the teeth lines (tooth grooves) when viewed in the axial direction, the helical gear thread turn counterclockwise in the advancing direction), and the left-twisted worm gear meshing with this helical gear 41 is used.

Figure 19:
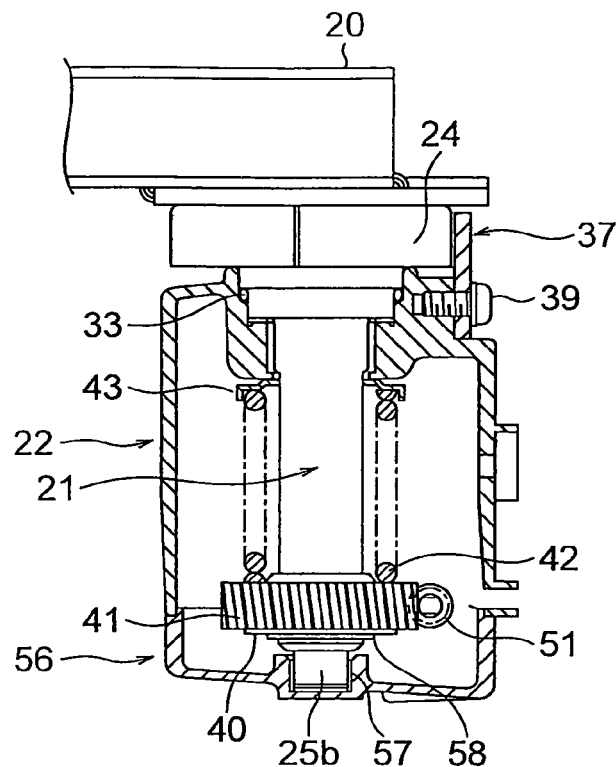
FIG. 19 is a schematic view for illustrating the function of the electric power outer mirror-housing device for use in automobile according to the present invention in the state that the helical gear is present at the standard position relative to the worm gear.
Figure 20:
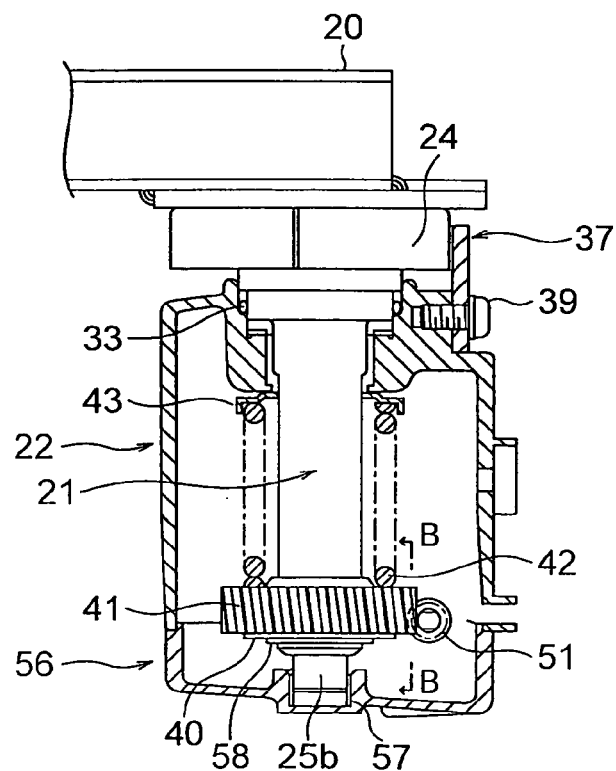
FIG. 20 is a schematic view for illustrating the function of the electric power outer mirror-housing device for use in vehicle according to the present invention in the state that the helical gear is raised relative to the worm gear through vibration of the vehicle.
Figure 21:
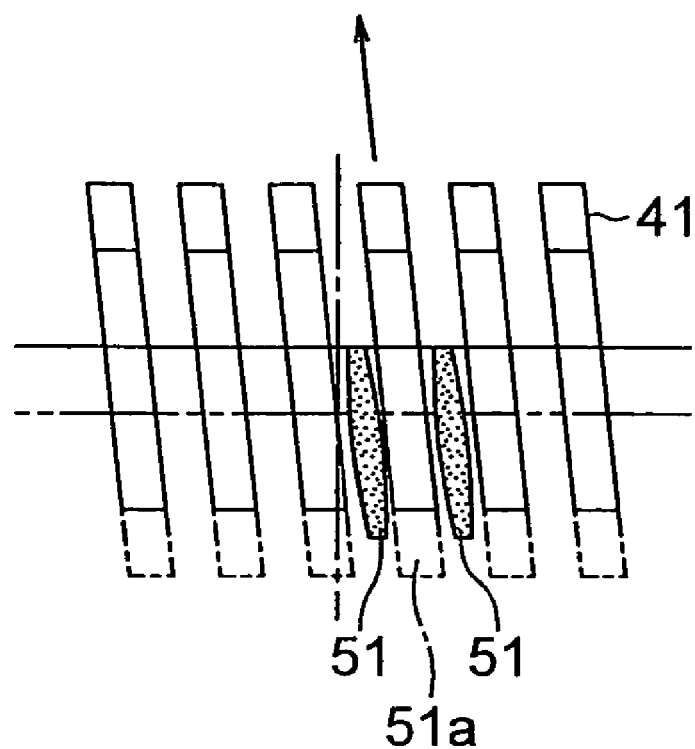
FIG. 21 is a figure showing the state that the helical gear moves relative to the thread grooves of the worm gear trough vibration of the vehicle.

The electric power vehicle outer mirror-housing device 2 in which the twisting direction of the helical gear 41 is left is attached to the left side of the driving section 11 and the outer mirror 12 is located at the use position. When the shaft 21 is raised, as shown in FIG. 20, from the position of FIG. 19 during driving the vehicle 10 through compression of the spring 42 based on vibration of the vehicle, the helical gear 41 moves to rise along the screw grooves 51a of the worm gear 51 as shown in FIG. 21. As the worm gear 51 moves in a raising direction, the helical gear turned clockwise because the left-hand helical gear 41 is used.

Figure 22:
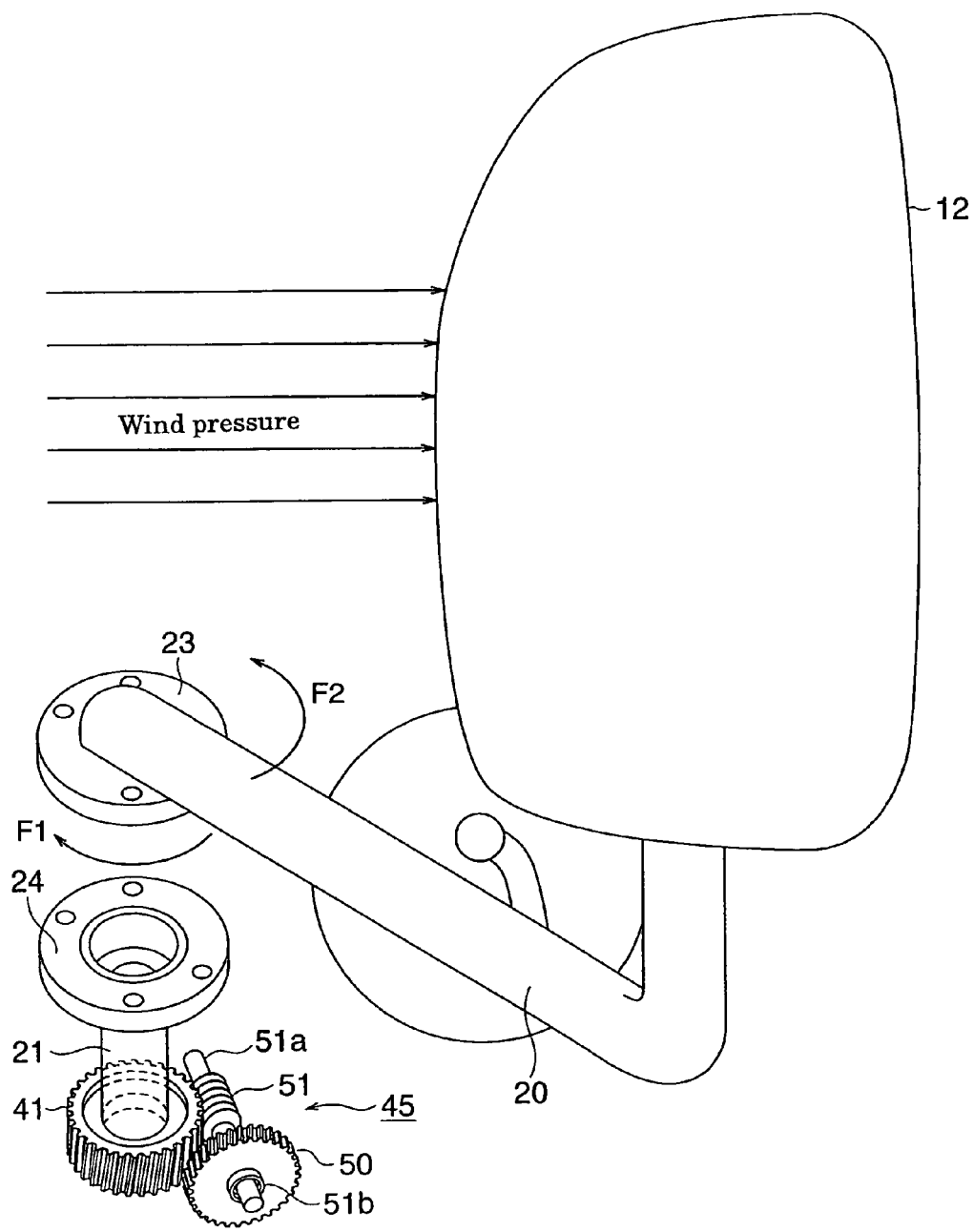
FIG. 22 is a schematic view for illustrating the rotary direction of the shaft when the helical gear moves relative to the worm gear through the vibration of the vehicle.

As a result, rotary force (arrow F1) acts upon the shaft 21 via the helical gear 41 to turn the shaft 21 clockwise, and as shown in FIG. 22, the rotary force is generated in a direction against that (arrow F2) of the torque to be applied to the outer mirror of the electric power vehicle outer mirror-housing device with the pressure of wind. Therefore, the phenomenon that the outer mirror is tilted toward the rear side of the vehicle with pressure of wind is mitigated.

The electric power vehicle outer mirror-housing device 2 in which the twisting direction of the helical gear 41 is right is attached to the right side of the driving section 11 and the outer mirror 12 is located at the use position. In this case, when the shaft 21 is raised during driving the vehicle 10 based on vibration of the vehicle, the helical gear 41 moves to rise along the screw grooves 51a of the worm gear 51. As the worm gear 51 moves in a raising direction, the helical gear turned counterclockwise because the right-hand worm gear 51 is used. As a result, rotary force (arrow F2) acts upon the shaft 21 via the helical gear 41 to turn the shaft 21 counterclockwise. Therefore, the phenomenon that the outer mirror is tilted toward the rear side of the vehicle with pressure of window is mitigated.

Generally speaking, in trucks such as freight cars, the stay for the outer mirror on the driver's seat is shorter than that for the outer mirror on the front-seat passenger side, and no under mirror is attached to the electric power outer mirror-housing device on the driver seat side. Thus, the wind pressure-receiving area of the electric power outer mirror-housing device is smaller on the driver seat side.

In such a case, the left-twisted helical gear 41 may be used on the right driver seat side 10.

According to this embodiment of the present invention, the phenomenon that the outer mirror is tilted with the wind pressure can be solved only by contriving the relationship in twisting between the helical gear 41 and the worm gear 51. Thus, increased cost of the spring owing to larger load of the spring 42 and raised cost of the motor owing to increased power of the motor 46 resulting from increased load of the driving mechanism can be suppressed.

What is claimed is:

1. A method for attaching an electric power outer mirror-housing device for a vehicle to the vehicle, said outer mirror-housing device comprising a shaft carrying an outer mirror and a driving mechanism for electrically driving the shaft and thereby turning the mirror between a use position and a housed position, said driving mechanism comprising a motor, a worm gear for transmitting turning motions of said motor, a helical gear meshing with the worm gear, and being inserted around the shaft and slidable along an axial direction of the shaft, and a clutch holder engaged with the helical gear and adapted to transmit a turning force of the helical gear to the shaft, said method comprising:

setting twisting directions of the helical gear and the worm gear so that when the housing device is attached to a given portion of the vehicle, a turning force is applied upon the shaft, in a direction opposed to a pressure of wind flowing from a front side to a rear side of the vehicle, by motion of the helical gear relative to the worm gear owing to vibration of the vehicle; and attaching the housing device to said given portion of the vehicle.

2. An electric power outer mirror-housing device to be attached to a given portion of a vehicle, comprising:

a shaft carrying an outer mirror; and a driving mechanism for electrically driving the shaft and thereby turning the mirror between a use position and a housed position, said driving mechanism comprising:

a motor;

a worm gear for transmitting turning motions of said motor;

a helical gear meshing with the worm gear, and being inserted around the shaft and slidable along an axial direction of the shaft; and a clutch holder engaged with the helical gear and adapted to transmit a turning force of the helical gear to the shaft, wherein twisting directions of the helical gear and the worm gear are so set that when the housing device is attached to said given portion of the vehicle, a turning force is applied upon the shaft, in a direction opposed to a pressure of wind flowing from a front side to a rear side of the vehicle, by motion of the helical gear relative to the worm gear owing to vibration of the vehicle, and wherein the housing device is configured to be attached to said given portion of the vehicle.

3. A method for attaching a pair of electric power outer mirror-housing devices for a vehicle to right and left sides of the vehicle, each of said outer mirror-housing device comprising a shaft carrying an outer mirror and a driving mechanism for electrically driving the shaft and thereby turning the mirror between a use position and a housed position, said driving mechanism comprising a motor, a worm gear for transmitting turning motions of said motor, a helical gear meshing with the worm gear, and being inserted around the shaft and slidable along an axial direction of the shaft, and a clutch holder engaged with the helical gear and adapted to transmit a turning force of the helical gear to the shaft, said method comprising:

setting twisting directions of the helical gear and the worm gear for each of the housing devices so that when each of the housing devices is attached to the corresponding right or left side of the vehicle, a turning force is applied upon the shaft, in a direction opposed to a pressure of wind flowing from a front side to a rear side of the vehicle, by motion of the helical gear relative to the worm gear owing to vibration of the vehicle; and attaching the housing devices to said right and left sides of the vehicle, respectively.

4. A pair of electric power outer mirror-housing devices for a vehicle to right and left sides of the vehicle, each of said outer mirror-housing device comprising:

a shaft carrying an outer mirror; and a driving mechanism for electrically driving the shaft and thereby turning the mirror between a use position and a housed position, said driving mechanism comprising:

a motor;

a worm gear for transmitting turning motions of said motor;

a helical gear meshing with the worm gear, and being inserted around the shaft and slidable along an axial direction of the shaft; and a clutch holder engaged with the helical gear and adapted to transmit a turning force of the helical gear to the shaft, wherein twisting directions of the helical gear and the worm gear for each of the housing devices are so set that when each of the housing devices is attached to the corresponding right or left side of the vehicle, a turning force is applied upon the shaft, in a direction opposed to a pressure of wind flowing from a front side to a rear side of the vehicle, by motion of the helical gear relative to the worm gear owing to vibration of the vehicle, and wherein the housing devices are configured to be attached to said right and left sides of the vehicle, respectively.

5. A vehicle comprising said pair of the electric power outer mirror-housing devices set forth in claim 4 to right and left sides of the vehicle.

* * * * *